US007424103B2

(12) United States Patent
Kernohan et al.

(10) Patent No.: US 7,424,103 B2
(45) Date of Patent: Sep. 9, 2008

(54) METHOD OF TELECOMMUNICATIONS CALL RECORD CORRELATION PROVIDING A BASIS FOR QUANTITATIVE ANALYSIS OF TELECOMMUNICATIONS CALL TRAFFIC ROUTING

(75) Inventors: William Philip Kernohan, Frisco, TX (US); Michelle Mary Tompkins, Thornton, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 924 days.

(21) Appl. No.: 10/924,886

(22) Filed: Aug. 25, 2004

(65) Prior Publication Data

US 2006/0045248 A1    Mar. 2, 2006

(51) Int. Cl.
*H04M 15/00*    (2006.01)
(52) U.S. Cl. ............. 379/126; 379/112.01; 379/114.04; 379/114.14

(58) Field of Classification Search ................. 379/111, 379/112.01, 112.03, 112.07, 112.08, 114.01, 379/114.04, 114.14, 126, 127.02
See application file for complete search history.

(56) References Cited

U.S. PATENT DOCUMENTS

| 6,694,001 | B1 * | 2/2004 | Lampell et al. ............. 379/189 |
| 6,721,405 | B1 * | 4/2004 | Nolting et al. .............. 379/133 |
| 6,891,938 | B1 * | 5/2005 | Scott et al. ............. 379/112.06 |
| 7,043,001 | B2 * | 5/2006 | Moisey et al. .......... 379/221.14 |
| 2003/0118169 | A1 * | 6/2003 | Savoor et al. ................ 379/219 |
| 2003/0147516 | A1 | 8/2003 | Lawyer et al. |
| 2004/0161084 | A1 * | 8/2004 | Lampell et al. ............. 379/111 |
| 2005/0088974 | A1 * | 4/2005 | Savoor et al. ................ 370/235 |
| 2006/0045251 | A1 * | 3/2006 | Liu et al. ............... 379/127.01 |

FOREIGN PATENT DOCUMENTS

WO    WO 2005/039203    4/2005

* cited by examiner

*Primary Examiner*—Binh K Tieu

(57) ABSTRACT

A method of identifying arbitrage includes determining whether originating and terminating call detail records (CDRs) are correlated and obtaining correlated candidate pairs from the determined CDRs; establishing whether a correlated candidate pair of the obtained correlated candidate pairs is a unique pair; and if established that a correlated candidate pair is unique, determining an amount of arbitrage based on the comparison of the originating and terminating CDR fields of the unique correlated candidate pair.

21 Claims, 7 Drawing Sheets

METHOD OF TELECOMMUNICATIONS CALL RECORD CORRELATION PROVIDING A BASIS FOR QUANTITATIVE ANALYSIS OF TELECOMMUNICATIONS CALL TRAFFIC ROUTING

BACKGROUND OF THE INVENTION

The present invention relates generally to telephone systems and, more particularly, to a method of call record correlation in a telecommunications system.

In the telephone system, complex regulatory tariffs have been mandated and/or inter-carrier contracts have been negotiated between carriers which (a) regulate the way in which traffic is to be routed between them and (b) specify the rates at which various types of traffic are to be charged. It is often of financial advantage to mis-route calls in violation of these existing regulatory tariffs and/or established inter-carrier contracts. The common name for this manipulation is "arbitrage". The intent of those perpetrating this mis-routing is to take advantage of lower rates associated with the delivery of telephone traffic via other than the proper routes. Confirming the presence of arbitrage and proper billing is often difficult due to the fact that call routing information is often missing or incomplete.

Previous methods for the determination of telephone traffic routing have been based upon a single call sample, e.g. a call record obtained at the point where the call originates or at the point where the call terminates. The information available within a single call record has limitations due to the fact that critical routing information may be (a) missing or (b) incorrect. These techniques have proven to be ineffective at determining the presence of arbitrage. Since in typical arbitrage situations, the local exchange carrier bills the interexchange carriers, there is a great financial incentive for the local exchange carrier to detect and stop arbitrage. Furthermore, since previous methods are both unreliable and labor intensive, there is a great need to improved manners for detecting arbitrage.

In general, the following definitions are common in the telephone industry, but are included herein for completeness and clarity of explanation.

Access Traffic
A compensation mechanism governed by tariffs and/or contracts for message traffic carried by interexchange carriers (IXC) and exchanged between the IXC's and local exchange carriers (LEC's), independent local exchange carrier (ILEC's), and competitive local exchange carrier (CLEC's). This type of traffic is generally carried over a type of telephone trunk called a Feature Group D trunk or FG-D trunk, and typically carries the highest per-minute charge. Under access traffic, IXC's pay the other carriers for each Minute of Use (MOU) of traffic destined to the IXC or originating from the IXC.

ACM Timestamp
The time at which the telephone being called began alerting the user (e.g. ringing).

Address Complete Message (ACM)
The Address Complete Message (ACM) is used to acknowledge receipt of an initial address message (IAM) and to indicate that the called party is being alerted (e.g. via ringing).

ANM Timestamp
The time the operator of the telephone being called answered the telephone.

Answer Message (ANM)
The Answer Message (ANM) is used to indicate that the user called has answered, end-to-end connection is established, and a conversation takes place.

Arbitrage
As used herein and as commonly used in the telephone industry, it is the mis-routing of inter-carrier telephone calls in such a way as to violate existing regulatory tariffs and/or established inter-carrier contracts. The purpose of such mis-routing is typically to take advantage of lower rates associated with the delivery of telephone traffic via routes other than those established and required by such tariffs and contracts and as such may be fraudulent. Arbitrage typically occurs via the following techniques: (1) interexchange carrier (IXC) access traffic delivered via competitive local exchange carriers (CLEC's) and (2) transit traffic delivered via non-transit trunks. However, there are many other ways in which arbitrage can occur.

Backward Interwork Parameter
An indicator as to whether Signaling System 7 (SS7) and non-SS7 inter-working was encountered ahead of this point in the call.

Call Detail Record (CDR)
A collection of messages including parameters associated with each call which provide detail regarding the call origin, destination, and other details. Such call detail records (CDRs) typically include, for example, time stamping, calling party number, called party number and many more fields.

Called Number
The telephone number dialed by the calling user.

Calling Number
The telephone number of the user making the call.

Carrier Identification Code (CIC)
Parameters contained within the Signaling System 7 (SS7) Initial Address Message (IAM) message which can be used to identify the requested interexchange carrier (IXC).

Carrier Identification Code Parameter
The number identifying the interexchange carrier (IXC) selected by the Local Exchange Carrier.

Charge Number
The telephone number to which the call is charged. Typically it is the telephone number of the calling telephone.

Competitive Local Exchange Carriers (CLEC)
A local exchange carrier (LEC) but specifically referring to one that competes with the incumbent local exchange carrier (LEC).

Destination Point Code (DPC)
The Signaling System 7 (SS7) node [e.g. switching office or Signaling Transfer Point (STP)] that the message is being sent to.

eo
A switching office normally referred to as an end office or "eo" to which telephones (from homes or businesses) are connected via wires called "loops".

Feature Group D Trunk (FG-D Trunk)
A type of telephone trunk. See Access Traffic.

Forward Interwork Parameter
An indicator as to whether Signaling System 7 (SS7) and non-SS7 inter-working was encountered prior to the point in the call where the parameter is observed.

IAM Timestamp
The time the trunk was seized for transmission of an SS7 message.

Independent Local Exchange Carriers (ILEC)
Generally refers to a local exchange carrier (LEC) which co-existed with a local exchange carrier owned by the Regional Bell Operating Companies.

Initial Address Message (IAM)
The Initial Address Message (IAM) is used to indicate the desire to set up a call. A trunk is seized and "reserved" for use in the call.

Interconnect Carrier
Any carrier that interconnects with the local exchange carrier (LEC).

Interexchange Carriers (IXC)
An interexchange carrier (IXC) transports calls from one local exchange carrier (LEC) to another, or possibly the same LEC, throughout the IXC's serving area. The IXC's serving area would typically span more than one local access transport area (LATA), and the IXC receives messages from and delivers messages to local exchange carriers (LEC's, CLEC's, and ILEC's) and other interchange carriers (IXC's). Calls that span local area transport areas (LATA's—geographical regions defined at divestiture) typically must use an IXC.

IXC Trunk
A trunk that comes from an interexchange carrier to a local exchange carrier.

Jurisdiction Indicator Parameter
A parameter contained in SS7 messages which, if available, indicates the geographic origin of a call.

Link Monitoring System (LMS)
A system that can be used to collect Call Detail Records (CDRs) by monitoring SS7 links.

Local Access Transport Area (LATA)
The geographic area within which a local exchange carrier (LEC) provides service is typically divided into various areas referred to as local access transport areas (LATA's).

Local Exchange Carrier (LEC)
A local exchange carrier (LEC) is a telephone service provider that provides telephone service to its customers in a specific geographical serving area. A local exchange carrier (LEC) would typically be a local telephone company.

Local Exchange Routing Guide (LERG)
A document defining the specific local access transport area (LATA) within which a given telephone number is located.

Location Routing Number (LRN)
A number obtained from the database at the service control point (SCP). The SCP converts the called number into the LRN which is the number used by the network to get the call to its final destination.

Loop
Telephones are connected (from homes or businesses) via wires called "loops" to a switching office normally referred to as an end office or "eo".

Meet-Point Billing
Traffic exchanged between interexchange carriers (IXC's) and independent local exchange carriers (ILEC's) destined for local exchange carrier (LEC) customers (in cases where the IXC does not directly interconnect with the LEC) is governed by tariffs and/or contracts, using a compensation mechanism referred to as meet-point billing. Under meet-point billing, IXC's pay the ILEC a fee, part of which is subsequently paid by the ILEC to the LEC for each Minute of Use (MOU) of traffic between the IXC and the LEC.

Minute of Use (MOU)
For billing purposes a measure of the time which a given carrier's resources are consumed providing a given service.

Numbering Plan Address (NPA)
More commonly known as the area code of the telephone number.

NPANXX
The numbering plan address (i.e., the area code) plus the next three digits of the telephone number.

Originating Point Code (OPC)
The Signaling System 7 (SS7) node [e.g. switching office or Signaling Transfer Point (STP)] that is sending the message.

Reciprocal Compensation
Under reciprocal compensation, carriers pay each other a usage fee for each Minute of Use (MOU) of traffic delivered from their network to the other carrier's network. This message traffic is typically traffic exchanged between various local exchange carriers (LEC's) and their competitive local exchange carriers (CLEC's) and independent local exchange carriers (LEC's). This type of traffic is generally carried over a type of telephone trunk called a local trunk.

Release Complete Message (RLC)
The Release Complete Message (RLC) is sent when the second of the two connected parties hangs up. At that point the trunk is released.

Release Message (REL)
The Release Message (REL) indicates that the first of the two connected parties has hung up.

REL Timestamp
The time the operator of the first telephone to hang up did so.

Remote Site Processors
A device used to consolidate partial Call Detail Records (CDRs) into complete CDR's.

RLC Timestamp
The time the operator of the second telephone to hang up did so.

Service Control Point (SCP)
A network database used to translate called numbers into local routing number which translates the called number in the location routing number (LRN).

Signaling Transfer Points (STP's)
At the heart of the SS7 network are packet switches known as Signaling Transfer Points (STP's). STP's are deployed in pairs in the North American SS7 network to provide communication path redundancy. Different carriers own a portion of the SS7 network and interconnect their end offices (eo's) and tandem's to the overall SS7 network so as to enable end-to-end communication between carriers.

SS7 Links
The communication links over which Signaling System 7 (SS7) traffic is carried.

SS7 Network

The Signaling System 7 (SS7) messages are transported over a secure data network referred to as the "SS7 network". The SS7 network comprises various SS7 Links along with Signaling Transfer Points (STP's).

SS7 Protocol

To perform the task of call setup and tear down when multiple end offices (eo's) are involved, switching offices communicate with each other using a signaling protocol referred to as Signaling System 7 (SS7), carried over SS7 links. SS7 messages are used in specific sequences to perform various tasks required to establish telephone connections. Telephone calls between two customers connected to the same eo will be handled by the application logic contained in the eo, and will not require the use of the SS7 protocol.

Tandem

In certain cases, for example two towns that are somewhat far apart, a type of switching center called a "tandem" is involved in establishing connectivity between two customers.

TCIC

Trunk Circuit Identification Code. Between any two telephone switches there may a trunk group which comprises several trunks. These trunks are identified via the TCIC.

Transit Network Selection (TNS)

Parameters contained within the Signaling System 7 (SS7) Initial Address Message (IAM) message which can be used to identify the requested interexchange carrier (IXC).

Transit Traffic

Traffic that goes thru a LEC network but does not originate or terminate in that LEC and uses trunks other than those specifically designated for such traffic.

Trunk

When telephones are served from different eo's (e.g. in different towns), they are interconnected via wires called "trunks" between the eo's.

UNE

Unbundled Network Elements (also known as UNE) are a requirement mandated by the Telecommunications Act of 1996. They are the parts of the network that the ILECs are required to offer on an unbundled basis. Together, these parts make up a loop that connects to a DSLAM or a voice switch (or both). The loop allows non-facilities-based telecommunications providers to deliver service without laying network infrastructure (copper/fiber).

UNE-P

UNE-Platform (also known as UNE-P) is a combination of UNEs (loop+port is SBC's definition, port involves switching which is bought per minute at a "cost" rate from the RBOCs) that allow end-to-end service delivery without ANY facilities. Despite not involving any CLEC facilities, it still requires facilities-based certification from the PUC to deliver services via UNE-P.

Wide Area Network (WAN)

A communication network serving a large geographical area of interest.

SUMMARY OF THE INVENTION

According to an aspect of the present invention, there is provided a method of identifying arbitrage including (a) determining whether originating and terminating call detail records (CDRs) are correlated and obtaining correlated candidate pairs from the determined CDRs; (b) establishing whether a correlated candidate pair of the obtained correlated candidate pairs is a unique pair; (c) and if established that a correlated candidate pair is unique, determining an amount of arbitrage based on the unique correlated candidate pair.

According to another aspect of the present invention, there is provided a method of identifying arbitrage and routing anomalies including (a) obtaining a plurality of originating call detail records (CDRs) from call data having a known route to a destination within a monitored network; (b) obtaining a plurality of terminating CDRs from the call data; (c) establishing whether the plurality of originating CDRs and the plurality of terminating CDRs are correlated candidate pairs based on uniquely originating and terminating CDRs having related call timings and called information; (d) if established that the plurality of originating and terminating CDRs are uniquely correlated, comparing fields of the originating and terminating CDRs to thereby determine an amount of arbitrage.

According to another aspect of the present invention, there is provided method of identifying arbitrage and routing anomalies including (a) establishing whether a plurality of originating and terminating call detail records (CDRs) are correlated based on originating and terminating CDR pairs and obtaining a plurality of correlated candidate pairs; (b) obtaining unique CDR pairs from the plurality of correlated candidate pairs and determining an amount of arbitrage based on the unique CDR pairs.

Additional aspects and advantages of the present invention will become apparent from the following detailed description, taken in conjunction with the accompanying drawings, illustrating by way of example the principles of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
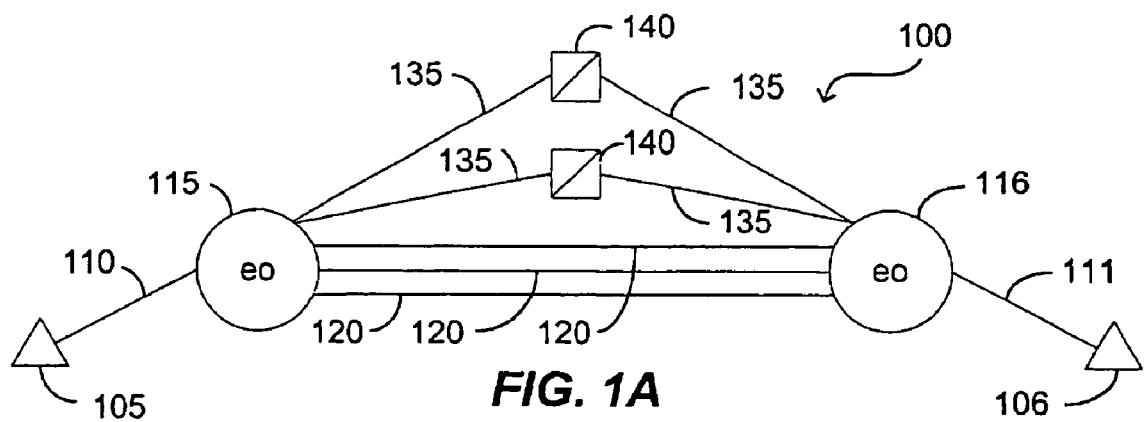
FIG. 1A is a diagram of a communication system according to an aspect of the present invention.

The present invention provides a novel method for the correlation of calls and for the detection of mis-routing of traffic in a communication system thus preventing arbitrage.

Correlation of call detail records obtained from various communication segments provides the ability to mutually enrich the records so as to increase billing accuracy as well as to enhance the detection of call mis-routing.

Techniques disclosed in the present invention can be used to identify inter-carrier telephone calls that are being mis-routed in such a way as to violate existing regulatory tariffs and/or established inter-carrier contracts The common name for this manipulation is "arbitrage", and the intent of the perpetrators is to take advantage of lower rates associated with the delivery of telephone traffic via routes other than those legislated or contracted. Through the process of correlation in representative embodiments, various call "legs" associated with the same call can be identified, and a more accurate "compound" call record can be made that incorporates call routing information obtained from the individual call legs.

Call detail records (CDR's) are collected throughout the LEC footprint and "correlated" at the time of their load into a call detail record database. The correlation method comprises identifying call segments via call detail records wherein (1) the called station numbers are identical and (2) the time of call initiation and the time the first party hangs up match within a configurable, but very small, time difference.

In order to eliminate false correlations (i.e., to disassociate call segments that really are not related to the same call), attempts are made to increase the correlation confidence by correlating other pieces of call setup information from the various call segments. Specifically, further efforts can be made to (1) confirm that the time the connection for the call was completed matches within a configurable, but very small, time difference, (2) insuring that the calling number information parameters match, (3) insuring that charge number information parameters match, and/or (4) insuring that jurisdiction information parameters match.

Additional constraints can be applied to select calls that fit the criteria of arbitrage, and to exclude calls that may be correlated for other legitimate reasons or duplicate call segments that may have been collected due to over-provisioning of the link monitoring systems.

Correlation of call detail records obtained from various communication segments provides the ability to mutually enrich the records so as to increase billing accuracy as well as to enhance the detection of call mis-routing. In the following detailed description and in the several figures of the drawings, like elements are identified with like reference numerals.

Through the process of correlation in representative embodiments, various call "legs" associated with the same call can be identified, and a more accurate "compound" call record can be made that incorporates call routing information obtained from the individual call legs. Other techniques disclosed herein can be used to correlate call data records created in one part of the network with call detail records created in another part. Such techniques have application in calling traffic, detection of call mis-routing, and call billing.

A local exchange carrier (LEC) operates in and serves individual telephone subscribers in a specific geographical serving area. The serving area is typically divided into Local Access Transport Areas (LATA's). The LEC interconnects to competitive local exchange carriers (CLEC's), Independent local exchange carriers (ILEC's) and Interexchange Carriers (IXC's) throughout its serving area.

Traffic exchanged between IXC's and LEC's/ILEC's/CLEC's is governed by tariffs and/or contracts, using a compensation mechanism referred to as access traffic. Under access traffic, IXC's pay the other carriers for each Minute of Use (MOU) of traffic destined to the IXC or originating from the IXC. This type of traffic is generally carried over a type of telephone trunk called a Feature Group D trunk or FG-D trunk, and typically carries the highest per-minute charge.

Traffic exchanged between CLEC's and LEC's and between ILEC's and LEC's is typically governed by tariffs and/or contracts, using a compensation mechanism referred to as reciprocal compensation. Under reciprocal compensation, carriers pay each other a usage fee for each Minute of Use (MOU) of traffic delivered from their network to the other carrier s network. This type of traffic is generally carried over a type of telephone trunk called a local trunk.

Traffic exchanged between IXC's and ILEC's destined to LEC customers (in cases where the IXC does not directly interconnect with the LEC) is governed by tariffs and/or contracts, using a compensation mechanism referred to as meet-point billing. Under meet-point billing, IXC's pay the ILEC a fee, part of which is subsequently paid by the ILEC to the LEC for each Minute of Use (MOU) of traffic between the IXC and the LEC.

Telephones are connected (from homes or businesses) via wires called "loops" to a switching office normally referred to as an end office or "eo". Telephone calls between two customers served by the same eo is handled by the application logic contained in the eo and will not require the use of the SS7 protocol described in the following.

When telephones are served from different eo's (e.g. in different towns), they must be interconnected via wires called "trunks" between the eo's. This type of telephone call will require inter-office coordination, usually via a networking protocol called SS7.

In certain cases, for example two towns that are somewhat far apart, another type of switching center called a "tandem" is also involved in establishing connectivity between two customers.

To satisfy various regulatory requirements, telephone carriers are classified as either "exchange carriers" (e.g., CLEC's) or "interexchange carriers" (e.g. IXC's). Calls that span Local Area Transport Areas must use an interexchange carrier.

Reference will now be made in detail to the embodiments of the present invention, examples of which are illustrated in the accompanying drawings, wherein like reference numerals refer to like elements throughout. The embodiments are described below to explain the present invention by referring to the figures.

To perform the task of call setup and tear down (when multiple eo's are involved), switching offices communicate with each other using a signaling protocol referred to as Signaling System 7 (SS7), carried over SS7 links. SS7 messages are used in specific sequences to perform various tasks required to establish telephone connections. The SS7 messages are transported over a secure data network separate from the telephone call connection and referred to as the "SS7 network". At the heart of the SS7 network are packet switches known as Signaling Transfer Points (STP's). STP's are deployed in pairs in the North American SS7 network to provide communication path redundancy. Different carriers own a portion of the SS7 network, and interconnect their eo's and tandem's to the overall SS7 network to enable end-to-end communication between carriers SS7 messages consist of a message type and associated parameters. FIGS. 1A-1F illustrate the use of SS7 in the basic setup and tear down of telephone calls. For clarity of illustration, the configuration described in FIGS. 1A-1F only comprises two eo's. The example is intended for illustrative purposes only. Other switching points and communication lines could be involved in any given connection between two stations.

Figure 1B:
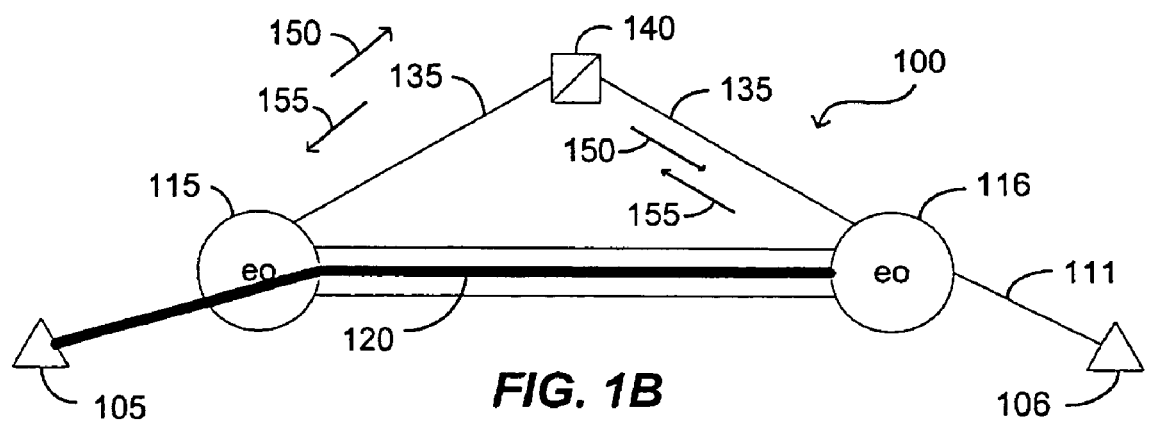
FIG. 1B is a diagram of the communication system in preparation for call connection according to an aspect of the present invention.
Figure 1C:
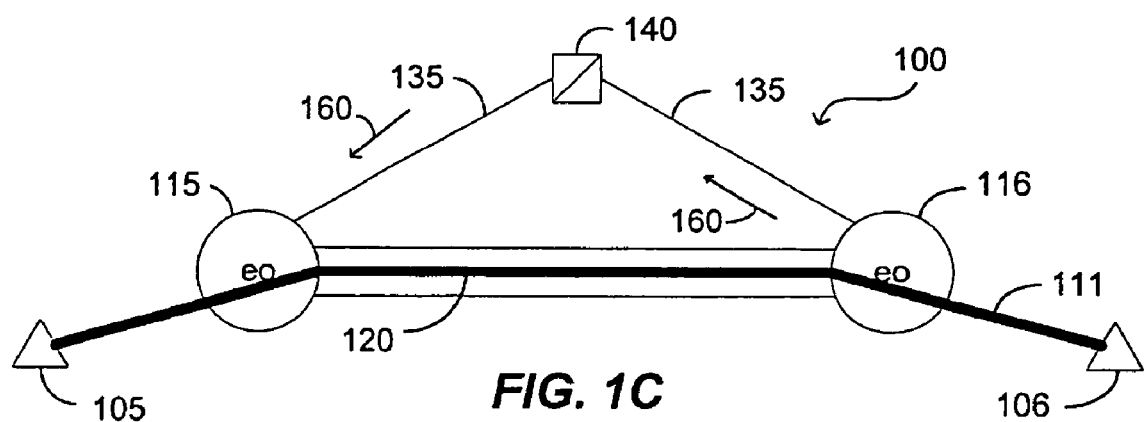
FIG. 1C is a diagram of the communication system with a call communication complete according to an aspect of the present invention.
Figure 1D:
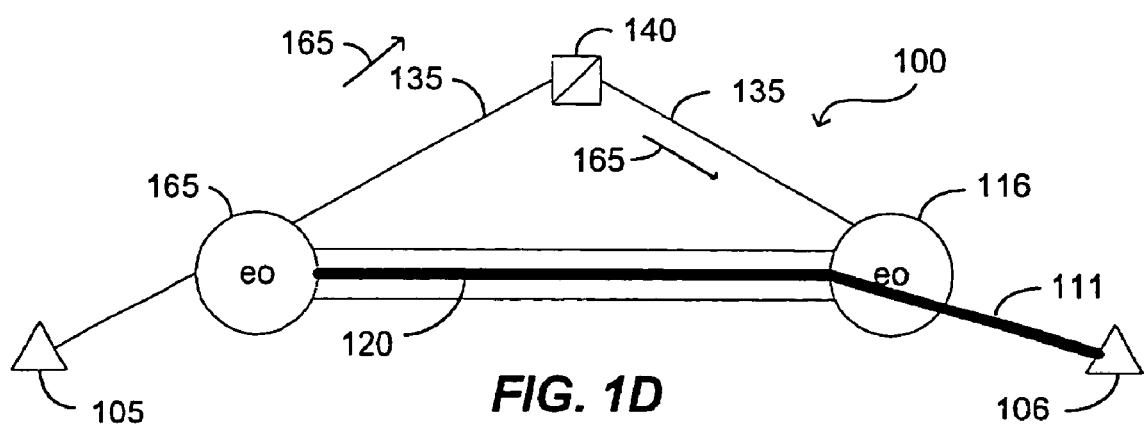
FIG. 1D is a diagram of the communication system with one party disconnected according to an aspect of the present invention.
Figure 1E:
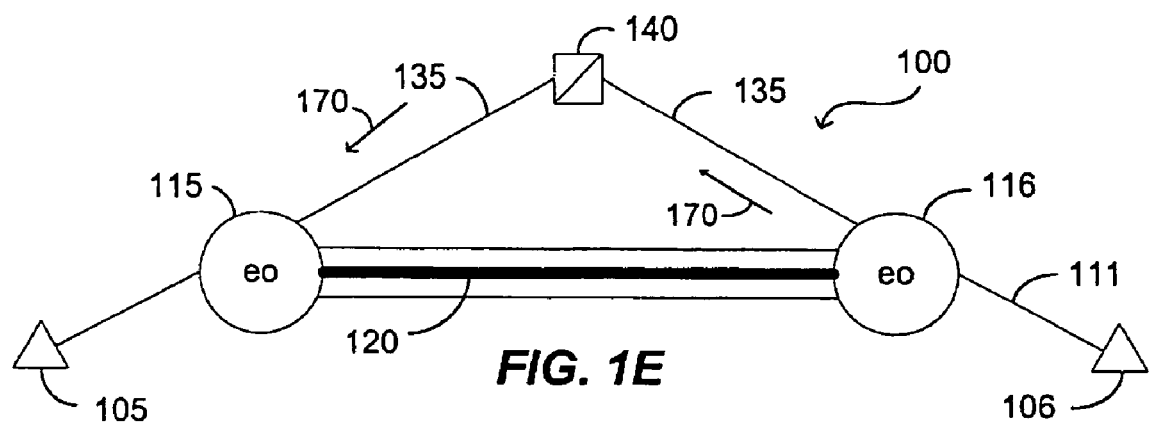
FIG. 1E is a diagram of the communication system immediately following last party disconnect according to an aspect of the present invention.
Figure 1F:
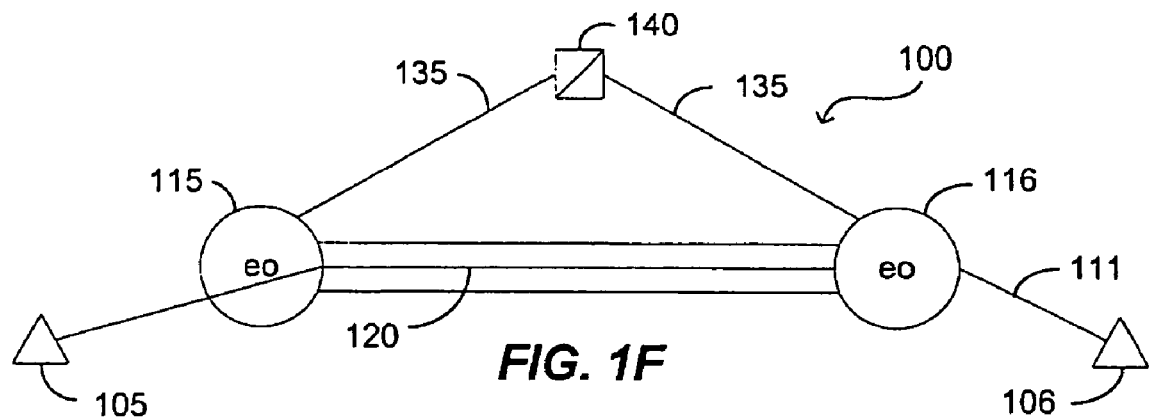
FIG. 1F is a diagram of the communication system after trunk release according to an aspect of the present invention.

FIG. 1A is a diagram of a telephone or communication system 100 according to an aspect of the present invention. FIG. 1B is a diagram of the telephone or communication system 100 in preparation for call connection according to an aspect of the present invention. FIG. 1C is a diagram of the telephone or communication system 100 with call connection complete according to an aspect of the present invention. FIG. 1D is a diagram of the telephone or communication system 100 with one party disconnected according to an aspect of the present invention. FIG. 1E is a diagram of the telephone or communication system 100 immediately following last party disconnect according to an aspect of the present invention. FIG. 1F is a diagram of the telephone or communication system 100 after trunk release according to an aspect of the present invention.

In FIG. 1A a first station 105, also referred to herein as a calling station 105 and as a calling telephone 105, is connected via a first loop 110 to a first switching office 115, also referred to herein as a first end office 115 and as a first eo 115. A second station 106 also referred to herein as a called station 106 and as a called telephone 106, is connected via a second loop 111 to a second switching office 116, also referred to herein as a second end office 116 and as a second eo 116. First and second switching offices 115,116 are connected to each other via a number of trunks 120. Two redundant signaling systems 130, form signal links 135, and transfer points 140. In modern telephone systems, signaling systems 130 are Signaling System 7 (SS7) networks 130, signal links 135 are SS7 links 135, and transfer points are signaling transfer points (STP's) 140. For clarity, identifying numeral 130 is not shown in the FIG. 1A but is understood to include the aforementioned elements. As previously mentioned, one or both of the signaling systems 130 is used for the passing of messages necessary to complete a connection between the calling station 105 and the called station 106.

In FIGS. 1B-1F, one of the redundant signaling systems 130 has been removed to aid in clarity of illustration.

In FIG. 1B, a first message 150, which in the SS7 system 130 is referred to as an initial address message (IAM) 150 and also herein as a call initiation signal 150, is sent from the first switching office 115 via signal links 135 and transfer point 140 of signaling system 130 to the second switching office 116 to indicate the desire to set up a call. Trunk 120 is then seized by the first switching office 115 and "reserved" for use in the call. Connection between calling station 105 and first switching office 115 (i.e., first loop 110), as well as the trunk 120 seized to connect first and second switching offices 115, 116 is indicated in FIG. 1B by bold lines. A second message 155, which in the SS7 system 130 is referred to as address complete message (ACM) 155, is sent from the second switching office 116 via signal links 135 and transfer point 140 of signaling system 130 to acknowledge receipt of the IAM 150 and to indicate that the called station 106 is being alerted (e.g., via ringing).

In FIG. 1C, a third message 160, which in the SS7 system 130 is referred to as an answer message (ANM) 160, is sent from the second switching office 116 via signal links 135 and transfer point 140 of signaling system 130 to the first switching office 115 to indicate when the called station 106 has answered. End to end connection is then established, and a conversation can take place. Connection between calling station 105 and first switching office 115 (i.e., first loop 110), between first and second switching offices 115,116 via the trunk 120, and between second switching office 116 (i.e., second loop 111) and called station 106 is indicated in FIG. 1C by bold lines.

In FIG. 1D, a fourth message 165, which in the SS7 system 130 is referred to as a release message (REL) 165, is sent from one of the switching offices, in this example the first switching office 115 via signal links 135 and transfer point 140 of signaling system 130 to the second switching office 116 to indicate that one of the parties, in this example calling station 105, has disconnected from the established communication link. In other words, the calling station 105 hung up. Connection between first and second switching offices 115,116 via the trunk 120 and between second switching office 116 (i.e., second loop 111) and called station 106 is indicated in FIG. 1D by bold lines.

In FIG. 1E, a fifth message 170, which in the SS7 system 130 is referred to as a release complete message (RLC) 170, is sent from one of the switching offices, in this example the second switching office 116 via signal links 135 and transfer point 140 of signaling system 130 to the first switching office 115 to indicate that one of the parties, in this example called station 106, has disconnected from the established communication link. Again in other words, the called station 106 hung up. Connection between first and second switching offices 115,116 via the trunk 120 is indicated in FIG. 1E by bold lines. At that point the trunk 120 is released as indicated in FIG. 1F.

Figure 2:
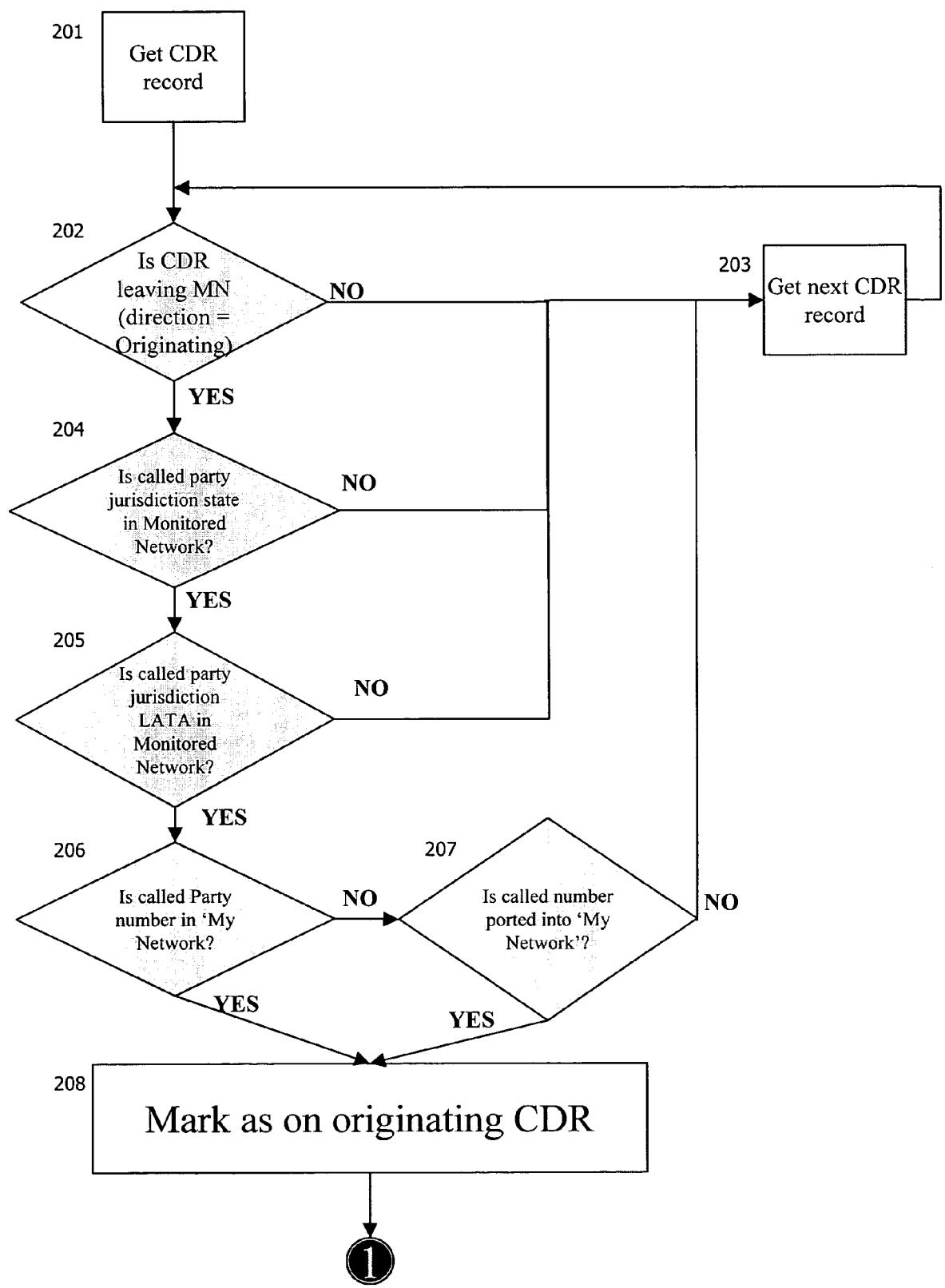
FIG. 2 is a flow chart illustrating the process of identifying originating call detail records (CDRs) according to an aspect of the present invention.

FIG. 2 is a flow chart illustrating the process of identifying originating call detail records (CDRs) according to an aspect of the present invention. Referring now to FIG. 2, at operation 201, a CDR record is retrieved from all the CDRs stored in a database (not shown). At operation 202, it is determined whether the CDR is originating; is leaving the monitored network (MN). If determined that the CDR is not originating, then a next CDR is retrieved from the database, as illustrated at operation 203. However, if determined that the CDR is originating, it is determined whether the called party jurisdiction state is in the MN at operation 204. After determining at operation 204, that the called party jurisdiction state is in the MN, at operation 205, it is determined whether the called party jurisdiction Local Access Transport Area (LATA) is in the MN. If the called party jurisdiction LATA is not in the MN, the process returns to retrieving a next CDR from the database as illustrated in operation 203. However, if the called party jurisdiction is in the LATA MN, the process proceeds to determining whether the called party number is in the monitored or my network, as illustrated at operation 206. If the called party number is in the MN, the CDR gets marked as an originating CDR ("ORIG CDR"). Alternatively, if the called party number is not in the network, then at operation 207, it is determined whether the called number is ported into the MN. If determined that the called number is ported into the MN, the CDR is marked as an originating CDR ("ORIG CDR"), as illustrated in operation 208.

Figure 3:
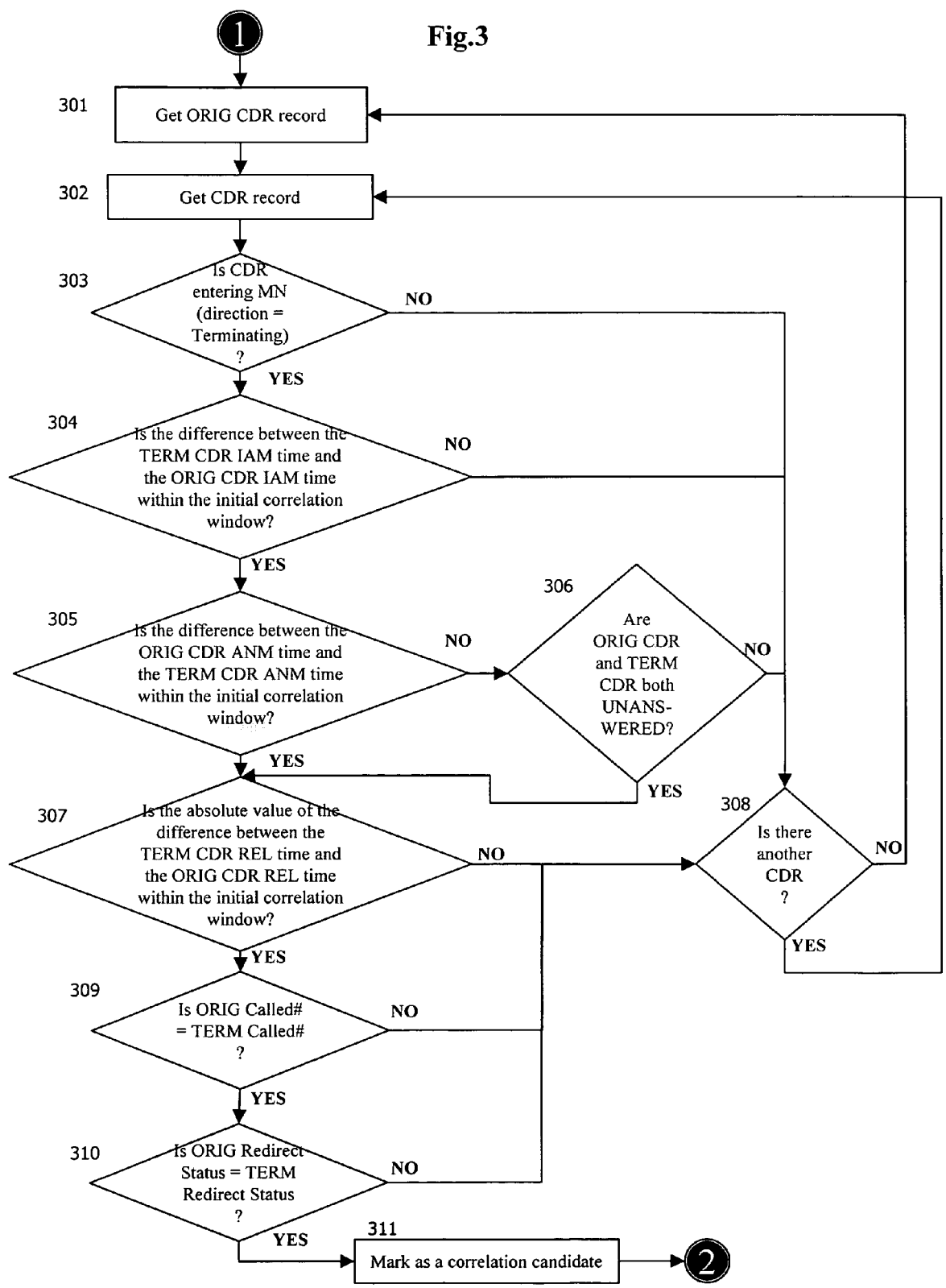
FIG. 3 is a flow chart illustrating a process of identifying correlation candidates according to an aspect of the present invention.

FIG. 3 is a flow chart illustrating a process of identifying correlation candidates according to an aspect of the present invention. At operations 301 and 302, an originating (ORIG) CDR and a CDR are retrieved from the database. At operation 303 it is determined whether the CDR is terminating; entering the monitored network (MN). If determined that the CDR is terminating, the CDR is marked as a terminating CDR ("TERM CDR"). At operation 304, it is determined whether a difference between the TERM CDR Initial Address Message (IAM) time and an ORIG CDR IAM time are within an initial correlation window. If at operation 303, it is determined that the CDR is not terminating, then another CDR is retrieved from the database and compared with the ORIG CDR.

At operation 305, it is determined whether the difference between an ORIG CDR Answer Message (ANM) time and a TERM CDR ANM time are within the correlation window. If the difference between the ORIG CDR ANM time and the TERM CDR ANM time are not within the initial correlation window, then at operation 306, it is determined whether the ORIG CDR and TERM CDR are both unanswered. If both the ORIG CDR and the TERM CDR are not both unanswered, then another CDR is searched for in the database as illustrated at operation 308.

At operation 307, it is determined whether an absolute value of the difference between a TERM CDR REL time and an ORIG CDR REL time are within the initial correlation window. If the absolute value is not within the initial correlation window, another CDR is searched from the database as illustrated at operation 308. If determined that the absolute value of the TERM CDR REL and the ORIG CDR REL is within the initial correlation window, the process continues to operation 309. At operation 309 it is determined whether the ORIG called number and the TERM called number are the same. If so, it is then determined whether the ORIG redirect status is equal to the TERM redirect status, as illustrated at operation 310. If not, another CDR is retrieved from the database as illustrated at operation 308. If at operation 310, it is determined that the ORIG redirect status is equal to the TERM redirect status, the records are marked as a correlation candidate, as illustrated at operation 311.

Figure 4A:
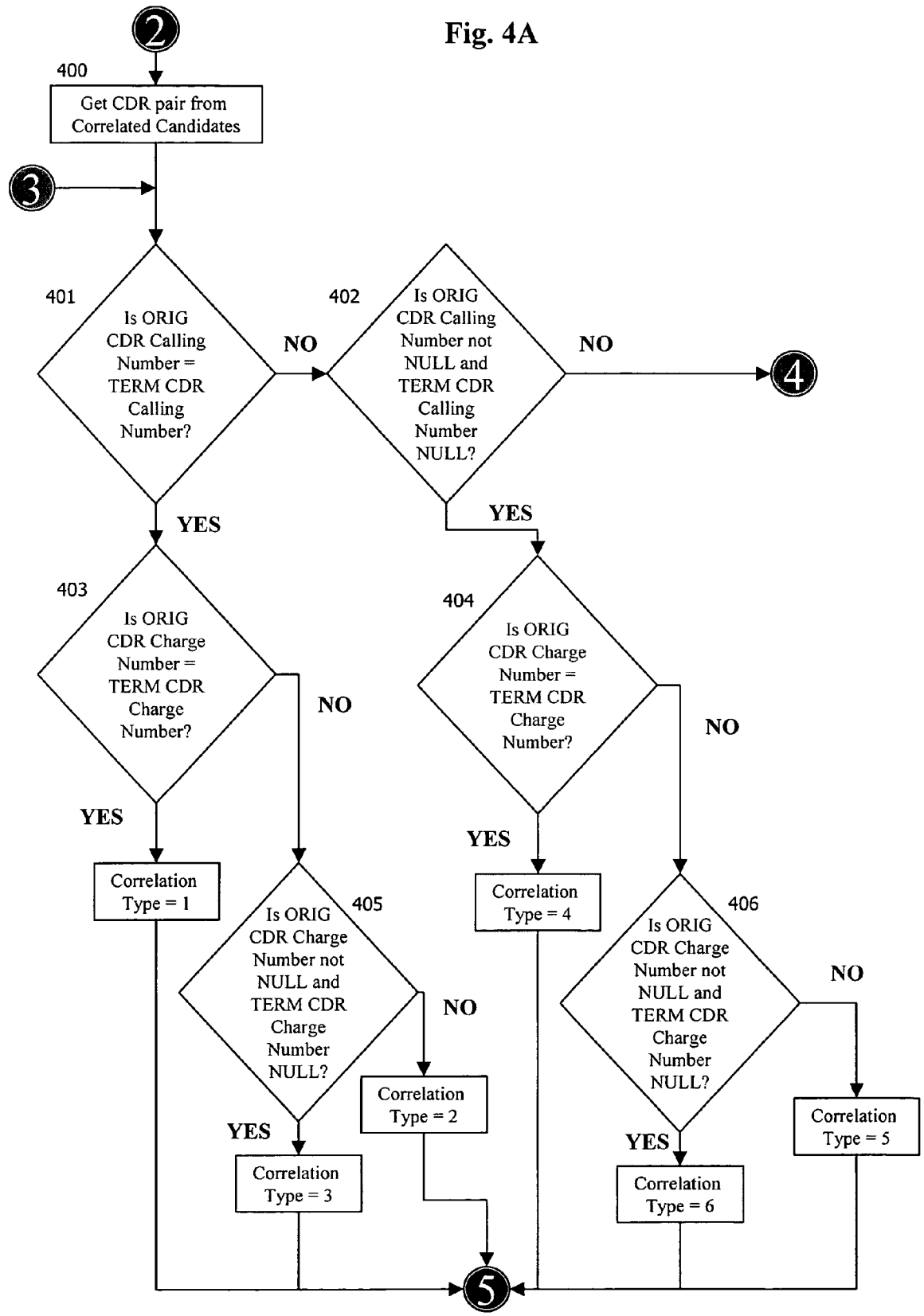
FIG. 4A is a flow chart illustrating a process of setting correlation types for all the correlation candidates according to another aspect of the present invention.

FIG. 4A is a flow chart illustrating a process of setting correlation types for all the correlation candidates according to another aspect of the present invention. The assignment of a correlation type for each correlation candidate provides the ability to segregate the methods by which the originating and terminating CDRs are correlated thereby simplifying the identification of arbitrage. Referring to FIG. 4A, at operation 400, a CDR pair from the correlation candidates is retrieved from the database (not shown), and it is determined whether the ORIG CDR calling number is equal to the TERM CDR calling number at operation 401. If the calling numbers are not the same, the process continues to operation 402, where it is determined whether the ORIG CDR calling number is not NULL and the TERM CDR calling number is null. If the ORIG CDR calling number is the same as the TERM CDR calling number the process continues to operation 403. At operation 403, it is determined whether the ORIG CDR charge number is equal to the TERM CDR charge number. If the charged numbers are the same, the correlation candidates are set to a type 1 correlation. If the charge numbers are not the same, then at operation 405 it is determined whether the ORIG CDR charge number is not NULL and the TERM CDR charge number is NULL. If determined that the ORIG CDR charge number is not null and the TERM CDR charge number is NULL, the correlation candidates are set to a type 3 correlation. If the above determination is negative, the correlation candidates are set to a type 2 correlation.

If at operation 402, it is determined that the ORIG CDR calling number is not NULL and the TERM CDR calling number is NULL, the process continues to operation 404. At operation 404, it is determined whether the ORIG CDR charge number is equal to the TERM CDR charge number. If both numbers are equal, then at operation 404, the correlation candidates are set to a type 4 correlation. If both numbers are determined not to be equal the process proceeds to operation 406. At operation 406 it is determined whether the ORIG CDR charge number is not NULL and the TERM CDR charge number is NULL. If the determination at operation 406 is yes, the correlation candidates are set to a type 6 correlation and if the determination is no, the correlation candidates are set to a type 5 correlation.

Figure 4B:
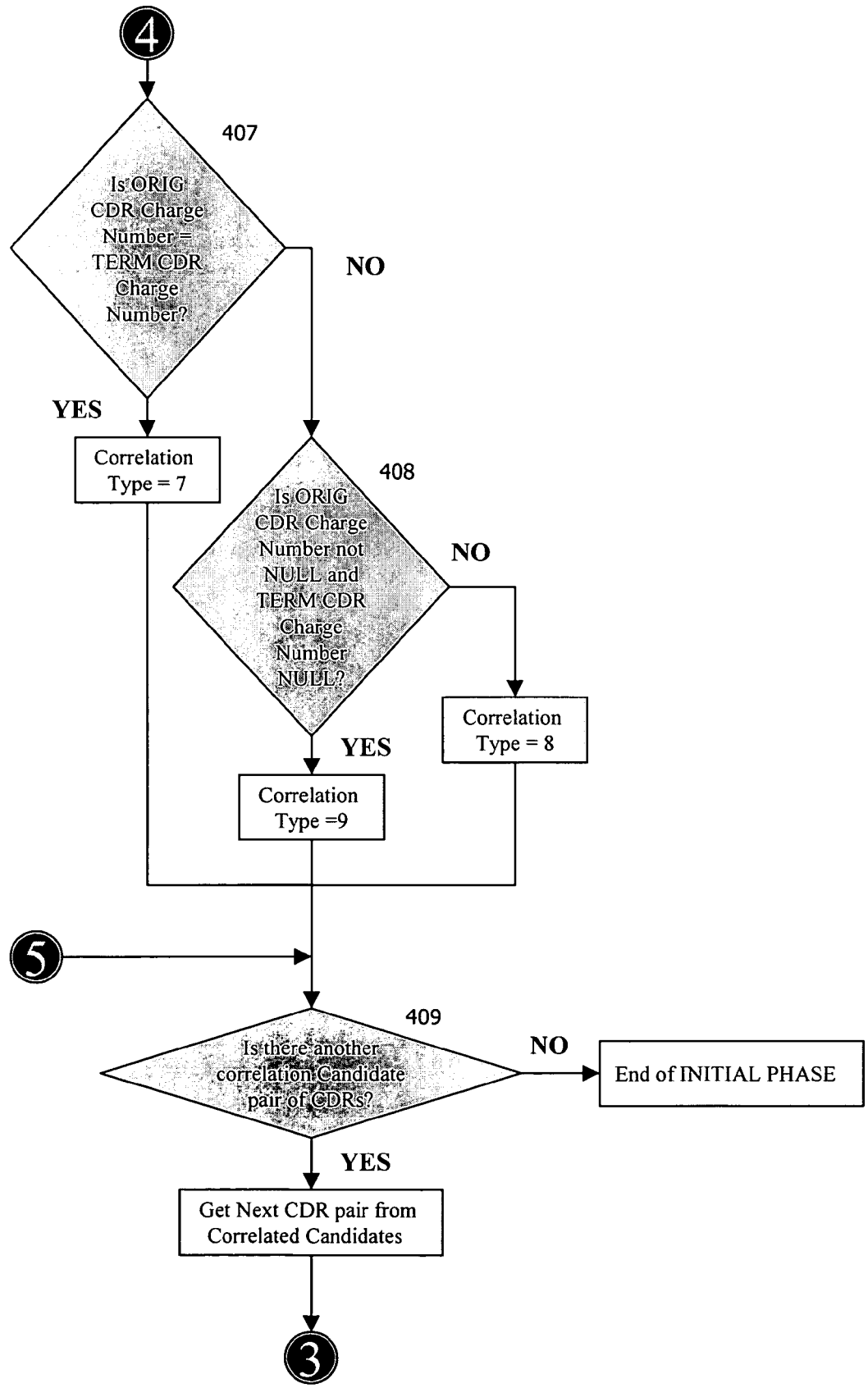
FIG. 4B is a flow chart illustrating setting correlation types for all correlation candidates according to an aspect of the present invention.

FIG. 4B is a flow chart illustrating setting correlation types for all correlation candidates according to an aspect of the present invention. Referring to FIG. 4B, if the determination of operation 402 is no, then, at operation 407, it is determined whether the ORIG CDR charge number is equal to the TERM CDR charge number. If so, the correlation candidates are determined to be type 7. If the determination at operation 407 is no, at operation 408, it is determined whether the ORIG CDR charge number is not NULL and the TERM CDR charge number is NULL. If the determination of operation 408 is yes, the correlation candidates are determined to be type 9 and if the determination of operation 408 is no, the correlation candidates are determined to be type 8.

Once all the correlation types have been set, at operation 409, it is determined whether there is another correlation candidate pair of CDRs, if no, the initial phase ends. If another correlation candidate pair exists, a next CDR pair from the correlated candidates is obtained and the process continues from operation 401.

Figure 5:
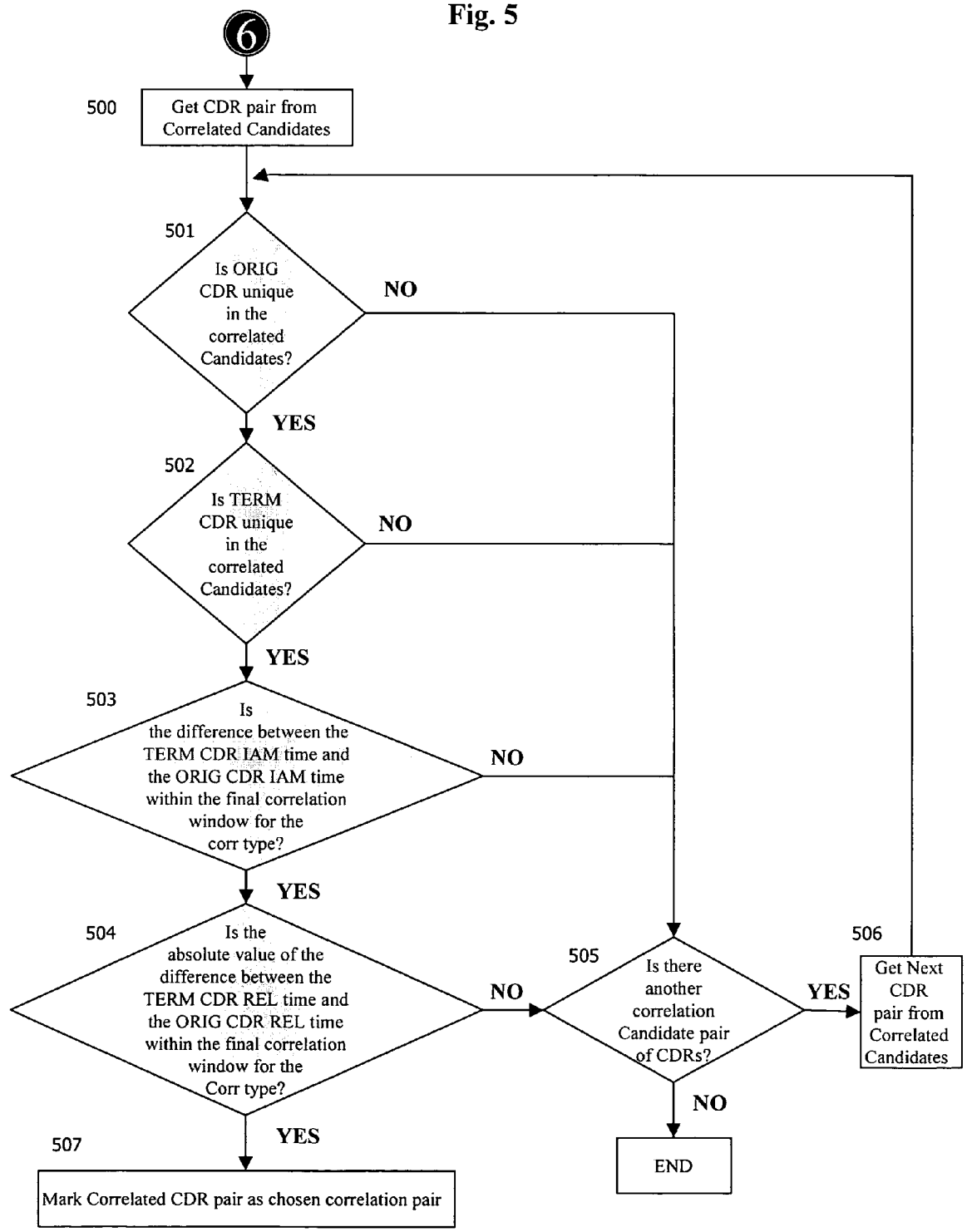
FIG. 5 is a flow chart illustrating a process of identifying a chosen correlation pair according to an aspect of the present invention.

FIG. 5 is a flow chart illustrating a process of identifying a chosen correlation pair according to an aspect of the present invention. Referring to FIG. 5, a CDR pair from the correlated candidates is retrieved from the database as illustrated at operation 500. Thereafter, at operation 501, it is determined whether the ORIG CDR is unique in the correlated candidates. If the ORIG CDR is not unique, the process proceeds to operation 505. At operation 505, it is determined whether another correlation candidate pair of CDRs exists. If another correlation candidate pair exists, a next CDR pair from the correlated candidates is retrieved, as illustrated at operation 506. If there is no other correlation candidate pair of CDRs, the process terminates.

Referring back to operation 501, if determined that the ORIG CDR is unique, the process proceeds to operation 502. At operation 502, a determination is made as to whether a TERM CDR is unique in the correlated candidates. If the TEM CDR is not unique the process continues to operation 505. On the other hand, if determined that the TERM CDR is unique the process continues to operation 503. At operation 503, it is determined whether a difference between the TERM CDR IAM time and the ORIG CDR IAM time are within a final correlation window for the correlation type. If the difference between the TERM CDR IAM time and the ORIG CDR IAM time are not within the final correlation window for the correlation type, the process continues to operation 505, where another correlation candidate pair of CDRs is searched.

On the other hand, if the difference between the TERM CDR IAM time and the ORIG CDR IAM time is within the final correlation window, the process continues to operation 504. At operation 504 it is determined whether the absolute value of a difference between the TERM CDR REL time and the ORIG CDR REL time is within the final correlation window for the correlation type. If the absolute value is not within the final correlation window, the process continues to operation 505, where a determination is made of whether another correlation candidate pair of CDR exists. If the absolute value is within the final correlation window, the correlated CDR pair is chosen as a correlation pair, as illustrated at operation 507.

Thereafter, CDR fields of the ORIG CDR and TERM CDR in the unique correlated pairs are compared. Fields compared may include, for example, trunk types (access, local), billing jurisdiction (intrastate, local), routing carrier (IXC A, CLEC C), calling number, charge number, and other types of information. These CDR fields may indicate suspect arbitrage activity when they differ between the ORIG CDR and the TERM CDR. Accordingly, based on the comparison of the CDR fields of the unique correlated pairs, arbitrage may be identified.

Although a few embodiments of the present invention have been shown and described, it would be appreciated by those skilled in the art that changes may be made in this aspect without departing from the principles and spirit of the invention, the scope of which is defined in the claims and their equivalents. Furthermore, the various protocols and methods disclosed in the present invention are not limited to any specific protocol or method.

What is claimed is:

1. A method of identifying arbitrage, comprising:
    determining whether originating and terminating call detail records (CDRs) are correlated and obtaining correlated candidate pairs from the determined CDRs;
    establishing whether a correlated candidate pair of the obtained correlated candidate pairs is a unique pair; and
    if established that a correlated candidate pair is unique, determining an amount of arbitrage based on the unique correlated candidate pair.

2. The method of claim 1, wherein the originating CDRs are determined by obtaining a CDR and determining whether a call is leaving a monitored network and whether a called party jurisdictional state is in the monitored network.

3. The method of claim 2, wherein the originating CDRs are determined by determining whether the called party jurisdiction Local Access Transport Area (LATA) and the called party number are in the monitored network.

4. The method of claim 3, wherein if the called party number is not in the monitored network determining whether the called party number is ported into the monitored network.

5. The method of claim 3, wherein if determined that the called party number is in the monitored network, marking the CDRs as originating CDRs.

6. The method of claim 1, wherein the correlated candidate pairs are obtained by selecting and comparing an originating CDR and a CDR and determining whether a call is entering the monitored network.

7. The method of claim 1, wherein the correlated candidate pairs are obtained by determining whether a difference between a terminating CDR Initial Address Message (IAM) time and an originating CDR IAM time are within an initial correlation window.

8. The method of claim 7, wherein the correlated candidate pairs are obtained by determining whether a difference between an originating CDR Answer Message (ANM) time and a terminating CDR ANM time are within the initial correlation window.

9. The method of claim 8, wherein the correlated candidate pairs are obtained by determining whether a difference between a terminating CDR Release Message (REL) time and an originating CDR REL time are within the initial correlation window.

10. The method of claim 9, wherein the correlated candidate pairs are obtained by determining whether an originating called number is equal to a terminating called number.

11. The method of claim 10, wherein the correlated candidate pairs are obtained by determining whether an originating redirect status is equal to a terminating redirect status.

12. The method of claim 1, wherein the unique candidate pair is established by whether a difference between a terminating CDR Initial Address Message (IAM) time and an originating CDR IAM time are within a final correlation window for a correlation type.

13. The method of claim 12, wherein the unique candidate pair is established by whether an absolute value of a difference between a terminating CDR Release Message (REL) time and an originating CDR REL time are within the final correlation window for the correlation type.

14. The method of claim 1, wherein the comparison of CDR fields of the unique correlated candidate pair indicate suspect arbitrage activity.

15. The method of claim 14, wherein the CDR fields of the unique correlated candidate pair include trunk types, billing jurisdiction, calling number, charge number and routing carrier.

16. A method of identifying arbitrage and routing anomalies, comprising:
    obtaining a plurality of originating call detail records (CDRs) from call data having a known route to a destination within a monitored network;
    obtaining a plurality of terminating CDRs from the call data;
    establishing whether the plurality of originating CDRs and the plurality of terminating CDRs are correlated candidate pairs based on uniquely originating and terminating CDR pairs having related call timings and called information; and
    if established that the plurality of originating and terminating CDRs are correlated, identifying unique correlated CDR pairs from the plurality of correlated candidate pairs to thereby determine an amount of arbitrage.

17. The method of claim 16, wherein the originating CDRs are obtained from call legs originating from the monitored network to a carrier.

18. The method of claim 16, wherein using reference data from the CDRs, geographic information for a called party number is derived.

19. The method of claim 18, wherein using reference data from the CDRs it is determined whether the called party number is a telephone number on the monitored network, a resold number on the monitored network, a Unbundled Network Elements (UNE) Port number on the network or the telephone number has been ported onto the monitored network.

20. A method of identifying arbitrage, comprising:
    establishing whether a plurality of originating and terminating call detail records (CDRs) are correlated based on originating and terminating CDR pairs and obtaining a plurality of correlated candidate pairs;
    obtaining unique CDR pairs from the plurality of correlated candidate pairs and determining an amount of arbitrage based on the unique CDR pairs.

21. A method of identifying arbitrage, comprising:
    means for determining whether originating and terminating call detail records (CDRs) are correlated;
    means for obtaining correlated candidate pairs from the determined CDRs;
    means for establishing whether a correlated candidate pair of the obtained correlated candidate pairs is a unique pair; and
    means for determining an amount of arbitrage based on the unique pair if established that a correlated candidate pair is the unique pair.

* * * * *